United States Patent [19]

Hofmann et al.

[11] 4,046,432

[45] Sept. 6, 1977

[54] BEARING ASSEMBLY AND ANCHOR THEREFOR

[75] Inventors: Charles J. Hofmann; Frederick F. Suess, both of Lancaster, Pa.

[73] Assignee: Fidelity Electric Company, Incorporated, Lancaster, Pa.

[21] Appl. No.: 694,364

[22] Filed: June 9, 1976

[51] Int. Cl.² ............................................. F16C 19/14
[52] U.S. Cl. .......................... 308/189 R; 308/207 R; 308/236
[58] Field of Search .............. 308/189 R, 207 R, 193, 308/195, 212, 213, 15, 176, 236

[56] References Cited

U.S. PATENT DOCUMENTS

| | | | |
|---|---|---|---|
| 3,669,519 | 6/1972 | Takahashi et al. | 308/236 |
| 3,672,734 | 6/1972 | Bando | 308/189 X |
| 3,738,720 | 6/1973 | Loehle | 308/236 |

*Primary Examiner*—Philip Goodman
*Assistant Examiner*—Gene A. Church

[57] ABSTRACT

A bearing assembly in which the race of a bearing is formed with an axial notch for receiving an anchoring plate for restraining relative rotation between the bearing and its housing while at the same time allowing for relative axial movement therebetween.

7 Claims, 12 Drawing Figures

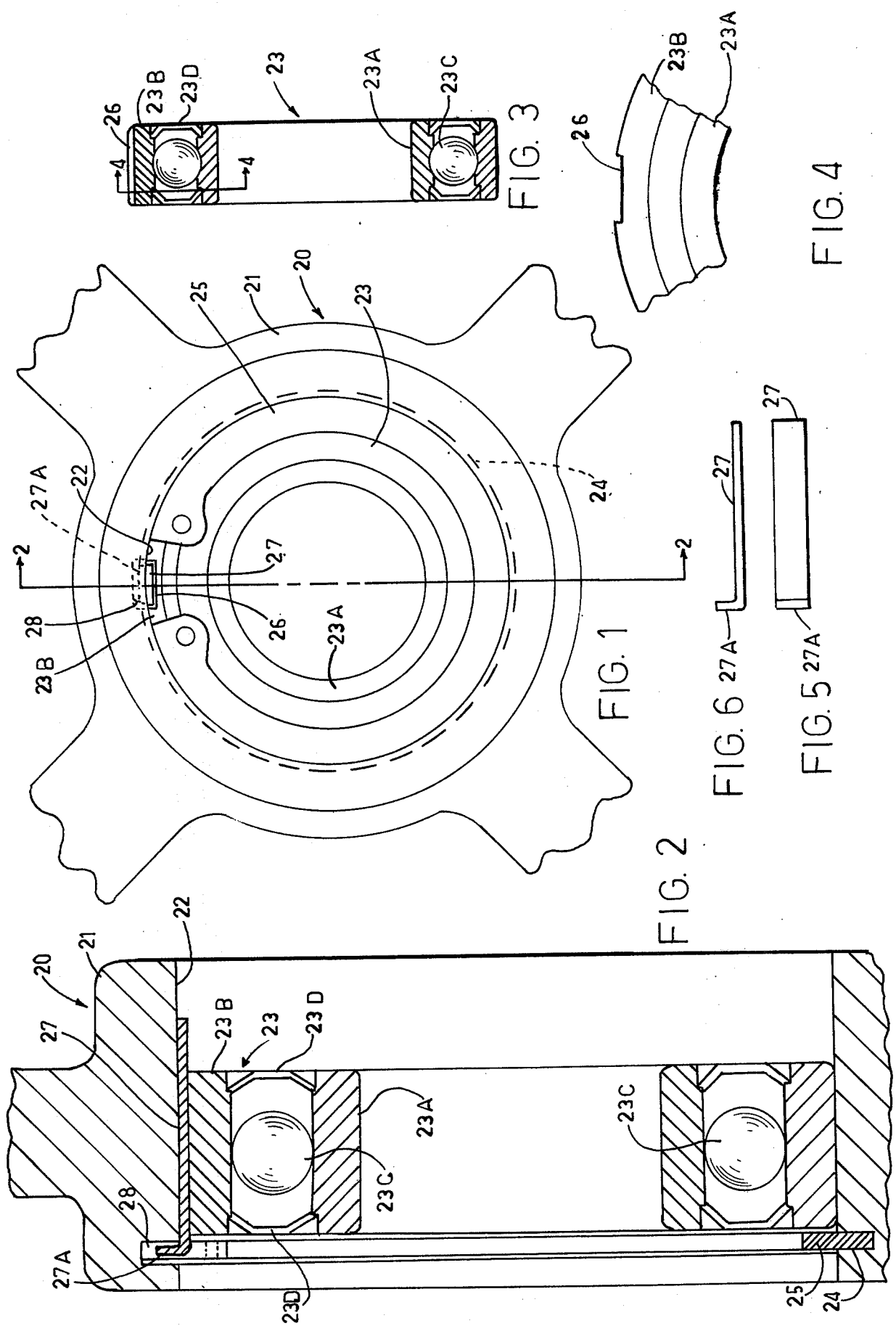

BEARING ASSEMBLY AND ANCHOR THEREFOR

BACKGROUND OF INVENTION

Heretofore, bearings for use in various rotating machines are generally retained within their appropriate housings with a tolerance of 0 to one thousandth (0.001) of an inch. However, even where such bearings are fitted to their housing with a 0 tolerance, there would be, under heavy loads, a tendency of the outer bearing race to rotate when placed in operation. Rotation of the bearing race relative to its housing results in excessive wear and heat which results in certain failure of the bearings. Such relative rotational movement between the bearing race and housing also subjects the housing to excess wear. Such relative rotation also tends to generate excessive heat which deteriorates the bearing lubricant and which can cause a serious lock-up of the rotating parts.

While efforts have been made to resolve the foregoing problem, the known methods have been relatively costly and difficult to fabricate, and/or had obvious disadvantages. Such prior known efforts included the use of clamping caps, collars and the like. However these devices tended to restrain the relative axial movement of the bearing which is sometimes not only desirable but essential for good bearing life. Also, these known devices were relatively costly and complicated.

A rubber plug inserted into a housing has also been used as a restraint to prevent relative rotation of a bearing race relative to its housing. However, such means have only a practical application in small motors, e.g., in portable tools. Further the rubber plug type restraints are relatively difficult to assemble, costly and not positive in operation.

OBJECTS

An object of this invention is to provide a relatively inexpensive and positive anchor for restraining relative rotation between a bearing race and its supporting housing.

Another object is to provide a relatively positive stop to prohibit relative rotation between a bearing race and its housing, while at the same time permitting relative axial movement to occur as may be required.

Another object is to provide a bearing anchor for resisting relative rotation which can be readily fabricated and assembled with a minimum of cost, and which is positive in operation.

BRIEF SUMMARY OF INVENTION

The foregoing objects and other features and advantages are attained in a bearing assembly which includes a bearing bracket housing and a bearing in which the bearing is supported in the housing with 0 or near zero tolerance. To restrain relative rotation between the bearing and its housing under heavy loading conditions and/or vibration, the bearing race is provided with an axial notch for receiving an anchor plate. One end of the anchor plate is angularly bent and arranged relative to the housing so as to resist relative rotation between the bearing race and its housing without resisting any relative axial movement therebetween.

FEATURES

A feature of this invention resides in the provision of an anchor for securing a bearing race against relative rotation with respect to its housing so as to minimize wear of the bearing and/or housing.

Another feature resides in a bearing anchor to resist relative rotation without limiting relative axial movement.

Other features and advantages will become more readily apparent when considered in view of the drawings and specification in which:

FIG. 1 is a front end view of a bearing assembly embodying the present invention.

FIG. 2 is a sectional view taken along line 2—2 on FIG. 1.

FIG. 3 is a detail sectional view of a bearing component embodying the present invention.

FIG. 4 is a sectional view taken along line 4—4 on FIG. 3.

FIG. 5 is a detail plan view of the bearing anchor plate.

FIG. 6 is a side view of the anchor plate.

DETAILED DESCRIPTION

Figure 7:
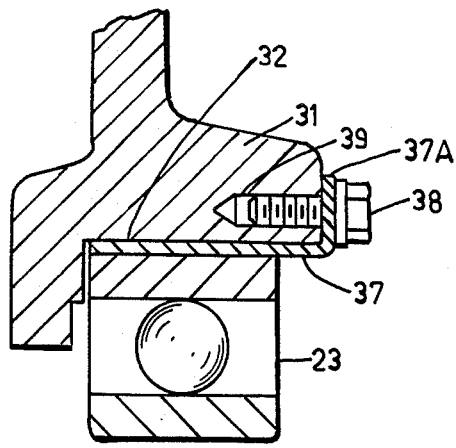
FIG. 7 is a fragmentary sectional view of a modified form of the invention.

Referring to FIGS. 1 and 2, there is shown a bearing assembly 20 embodying the present invention. The bearing assembly 20 includes a bearing bracket housing 21 having an opening 22 sized to receive a bearing 23. As best seen in FIGS. 1 and 2, the housing 21 is provided with an annular groove 24 circumscribing the opening 22 for receiving split spring retaining ring 25 for retaining the bearing 23 within the bearing bracket housing 21. The bearing 23 comprises an inner race 23A and an outer race 23B between which a series of ball bearings 23C are disposed in rolling engagement therewith. If desired annular side bearing shields 23D are interposed between the races for protecting the ball bearings 23C.

As is customary, the outer race 23B of the bearing 23 is fitted to the opening 22 in the bearing bracket housing 21 with a very close tolerance, e.g., 0 tolerance, or 0.001 inch tolerance.

To prevent relative rotation between the outer bearing race 23B and the bearing bracket housing 21 when the bearing is subjected to heavy loadings and/or excessive vibration or temperature differential, and anchor means is provided. In accordance with this invention, the anchor means comprises an axial notch 25 formed in the outer circumference of the outer bearing race 23B. An anchor plate 27 adapted to be received in notch 26 is provided to restrain the outer race 23B from rotating angularly relative to the bearing bracket housing 21. As best seen in FIGS. 5 and 6, the anchor plate 27 comprises a flat plate having an upturned end portion 27A. In assembly, the flat plate portion of the anchor plate 27 is disposed within the axial notch 26 of the outer bearing race 23B so that the up turned end portion or tip 27A is received and confined in a notch 28 formed in the bearing bracket housing 21. The notch 28 receiving the upturned portion 27A of the anchor plate 27 thus limits the anchor plate 27 and prevents the bearing race 23B from rotating relative to the housing 21 in the event there is a tendency for the outer bearing race to rotate. Since the upturned end 27A of the anchor plate 27 is prohibited from moving, and since the plate portion of the anchor 27 is keyed to the outer bearing race 23B, it will be apparent that regardless of the load or vibration imparted to the bearing assembly, that relative rotation between the outer bearing race 23B and the bearing bracket housing 21 is restricted.

Figure 8:
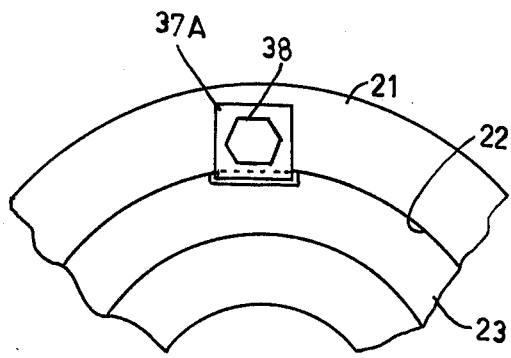
FIG. 8 is a right end view of FIG. 5.

FIGS. 7 and 8 illustrate a modified form of the invention. In this form of the invention the bearing bracket housing 31 is provided with an annular opening 32 for receiving the bearing 23. However, in this form of the invention the anchor plate 37 is secured to the bearing bracket housing 31 by a fastening means, such as a bolt or screw 38, which extends through the upturned lip portion 37A of the anchor plate 37 and which is threaded into a tapped hole 39 in the bearing bracket housing 31.

In all other respects the construction and operation of the bearing assembly of FIGS. 7 and 8 is similar to that described with respect to FIGS. 1 through 6.

Figure 9:
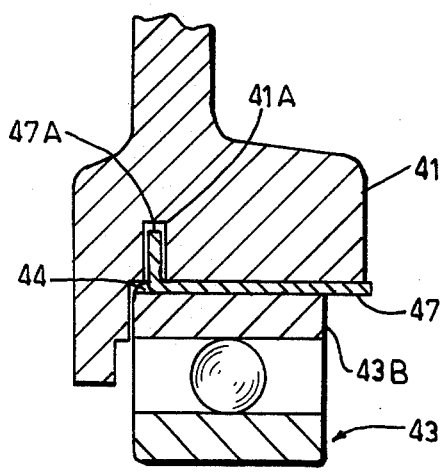
FIG. 9 is a fragmentary sectional view of another modified form of the invention.
Figure 10:
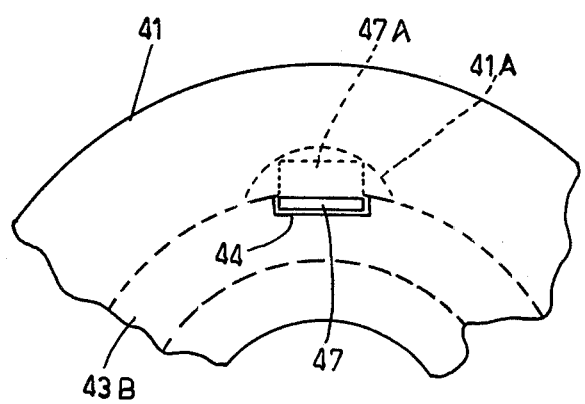
FIG. 10 is a left end view of FIG. 7.

FIG. 9 and 10 illustrate another modified form of the invention. In this form of the invention, the bearing bracket housing 41 is provided with an internal notch 41A which is adapted to receive the upturned end or tip 47A of the anchor plate 47. As hereinbefore described, the outer race 43B of the bearing 43 is provided with an axial notch 44 for receiving the plate portion of the anchor plate 47. Thus, as best seen in FIG. 10 in the assembled position, the anchor plate 47 secures the outer race of 43B of the bearing member 43 from rotating relative to the bearing bracket housing 41.

Figure 11:
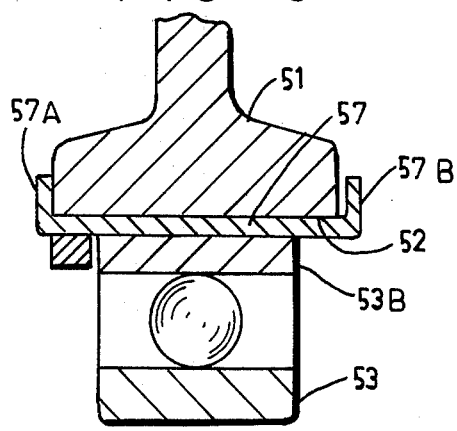
FIG. 11 illustrates a sectional view of another modified form of the invention.
Figure 12:
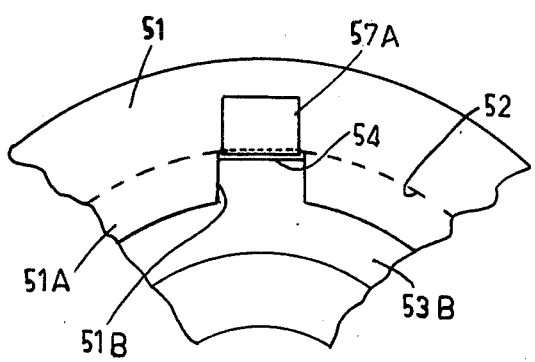
FIG. 12 is a left end view of FIG. 9.

FIGS. 11 and 12 illustrate another modified form of the invention. In this form of the invention, the bearing bracket housing 51 is provided with an annular flange 51A circumscribing one end of the opening 52, and which flange 51A is provided with a notched out portion 51B, as best seen in FIG. 12. The outer race 53B of the bearing 53 is provided with an axial notch 54 formed therein for receiving the plate portion of the anchor plate 57. As best seen in FIG. 9, both ends 57A, 57B of the anchor plate 57 are upwardly turned to embrace the side edges of the bearing housing bracket 51. The arrangement is such that the axial notch 54 is disposed in alignment with the notch 51B formed in the housing flange 51A so that anchor plate 57 is extended through notch 51B and thus restrains any relative rotation between the bearing race 53B and the housing 51.

In each of the described constructions, it will be noted that the anchor plate comprises a relatively simple structure which in the assembled position will restrain any tendency of the outer bearing race of a bearing from rotating relative to the bearing bracket housing when subjected to heavy loading and/or vibration and/or temperature differentials.

While the anchor bracket restrains relative rotation of the outer bearing race relative to the bearing bracket housing, the arrangement is such that the bearing is nevertheless free to move axially of the bearing bracket housing which is essential to provide for any thermal expansion. By prohibiting any relative rotation between the outer bearing race and its bearing bracket housing any tendency to wear is minimized. Also, by prohibiting relative rotation between the outer bearing race and the bearing housing, the generation of any excessive heat is also prohibited. As a result, the bearing lubricant does not tend to deteriorate and bearing life is thereby extended. The prohibiting of the relative rotation of the outer bearing race relative to the bearing bracket housing without limiting the axial movement therebetween further enchances the overall life of the bearing.

While the instant invention has been described with respect to several embodiments thereof, it will be readily appreciated and understood that variations and modifications may be made without departing from the spirit or scope of the invention.

What is claimed is:

1. A bearing assembly comprising:
    a bearing bracket housing,
    a bearing means having a bearing race fitted in said bearing bracket housing,
    means for retaining said bearing means within said housing,
    and means for anchoring said bearing race to said housing so as to prohibit relative motion therebetween while permitting limited axial movement therebetween,
    wherein said anchoring means comprises,
    an axial notch formed on said race,
    an anchor plate fitted in said notch,
    said anchor plate having an angularly disposed tip at one end thereof,
    and means for securing said tip relative to said housing.

2. The invention as defined in claim 1 wherein said latter means includes a notch formed in said housing to confine said tip therein.

3. The invention as defined in claim 1 wherein said latter means comprises a fastener for securing said tip to said housing.

4. The invention as defined in claim 1 wherein the other end of said anchor plate has an angularly disposed end tip.

5. A bearing assembly comprising:
    a bearing bracket housing,
    a bearing means including an inner race, and outer race and a series of bearings circumferentially disposed between said inner and outer races,
    said bearing means being fitted to said housing,
    a split retaining ring for retaining said bearing means in said housing,
    said split retaining ring having a spaced apart end portion,
    said outer race having an axial notch formed thereon,
    said axial notch being disposed between the spaced apart ends of said retaining ring,
    a means for anchoring said outer bearing race to said housing,
    said anchoring means includes an anchor plate disposed in the notch of said outer race, said anchor plate having a turned end tip,
    and said housing having a groove for confining said end tip in said groove, whereby relative rotation between said outer bearing race and said housing is prohibited while permitting for limited axial movement therebetween.

6. In a bearing having an inner race, an outer race, and a series of bearings confined between said races the improvement wherein
    one of said races has an axial notch formed thereon, and
    an anchor for prohibiting relative movement between said outer race and its housing,
    said anchor being disposed in said notch,
    and said anchor having a portion adapted to be fixed against relative rotation to a bearing housing.

7. In a bearing having an inner race, an outer race, and a series of bearings confined between said races, the improvement wherein one of said races has an axial notch formed thereon, said notch being adapted to receive an anchor for prohibiting relative movement between said outer race and its housing, and including an anchor plate disposed in said notch, and said anchor plate having an angular bent tip portion.

* * * * *